(12) United States Patent
Snyder

(10) Patent No.: US 6,464,182 B1
(45) Date of Patent: *Oct. 15, 2002

(54) DUCT BRACKET WITH PIPE CLAMPS

(75) Inventor: Darryl L. Snyder, Canton, OH (US)

(73) Assignee: Snyder National Corporation, Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/546,508

(22) Filed: Apr. 11, 2000

Related U.S. Application Data

(63) Continuation-in-part of application No. 29/108,096, filed on Jul. 20, 1999, now Pat. No. Des. 436,835, and a continuation-in-part of application No. 09/080,565, filed on May 18, 1998, now Pat. No. 6,062,515.

(51) Int. Cl.[7] ............................................... F16B 15/00
(52) U.S. Cl. ..................... 248/71; 248/62; 248/217.2; 248/68.1; 248/74.1; 248/546
(58) Field of Search ........................... 248/62, 63, 74.2, 248/214, 231.81, 57, 65, 58, 59, 70, 71, 217.2, 217.3, 218.1, 218.3, 87, 88, 200.1; 52/27, 39, 407.3

(56) References Cited

U.S. PATENT DOCUMENTS

| 796,178 | A | * | 8/1905 | Beaton | 248/57 |
|---|---|---|---|---|---|
| 2,917,263 | A | * | 12/1959 | Appleton et al. | 248/217.3 |
| 3,162,413 | A | * | 12/1964 | Hexdall | 248/71 |
| 3,163,386 | A | * | 12/1964 | Collins | 248/217.2 |
| 3,189,682 | A | * | 6/1965 | Irish | 248/71 |
| 3,285,553 | A | * | 11/1966 | Hexdall | 248/71 |
| 3,322,381 | A | * | 5/1967 | Bubb | 248/121 |
| 3,582,030 | A | * | 6/1971 | Barrett, Jr. | 248/74 |
| 3,718,307 | A | * | 2/1973 | Albanese | 248/57 |
| 3,778,537 | A | * | 12/1973 | Miller | 174/163 R |
| 3,807,675 | A | * | 4/1974 | Seckerson et al. | 248/73 |
| 3,884,438 | A | * | 5/1975 | Logsdon | 248/59 |
| 4,356,986 | A | * | 11/1982 | Lynch | 248/57 |
| 4,518,141 | A | * | 5/1985 | Parkin | 248/546 |
| 4,538,786 | A | * | 9/1985 | Manning | 248/57 X |
| 4,618,114 | A | * | 10/1986 | McFarland | 248/65 |
| 4,717,099 | A | * | 1/1988 | Hubbard | 248/546 X |
| 5,720,461 | A | * | 2/1998 | Kerr, Jr. | 248/317 |
| 6,062,515 | A | * | 5/2000 | Snyder | 248/62 |
| 6,205,719 | B1 | * | 3/2001 | Bruce | 52/147 |
| D442,063 | S | * | 5/2001 | Snyder | D8/349 |
| 6,296,211 | B1 | * | 10/2001 | Snyder | 248/71 |

* cited by examiner

Primary Examiner—Anita King
Assistant Examiner—Naschica S Morrison
(74) Attorney, Agent, or Firm—Sand & Sebolt

(57) ABSTRACT

A duct bracket includes a main body member having first and second channels extending longitudinally through the main body member. A first rod is slidably and rotatably mounted in the first channel. The first rod has a projecting end extending out of the main body member. A second rod is slidably and rotatably mounted in the second channel. The second rod has a projecting end extending out of the main body member. The projecting end of the first rod is on an opposite end of the main body member than the projecting end of the second rod. A U-shaped holder snaps over the main body member so that it does no have to be slid over the end of the main body member.

24 Claims, 10 Drawing Sheets

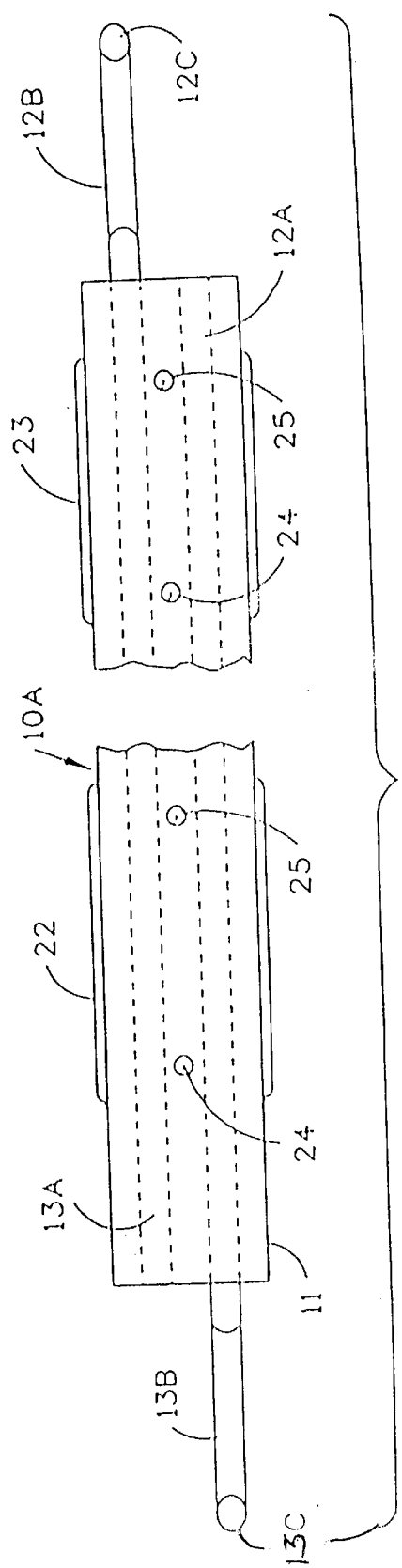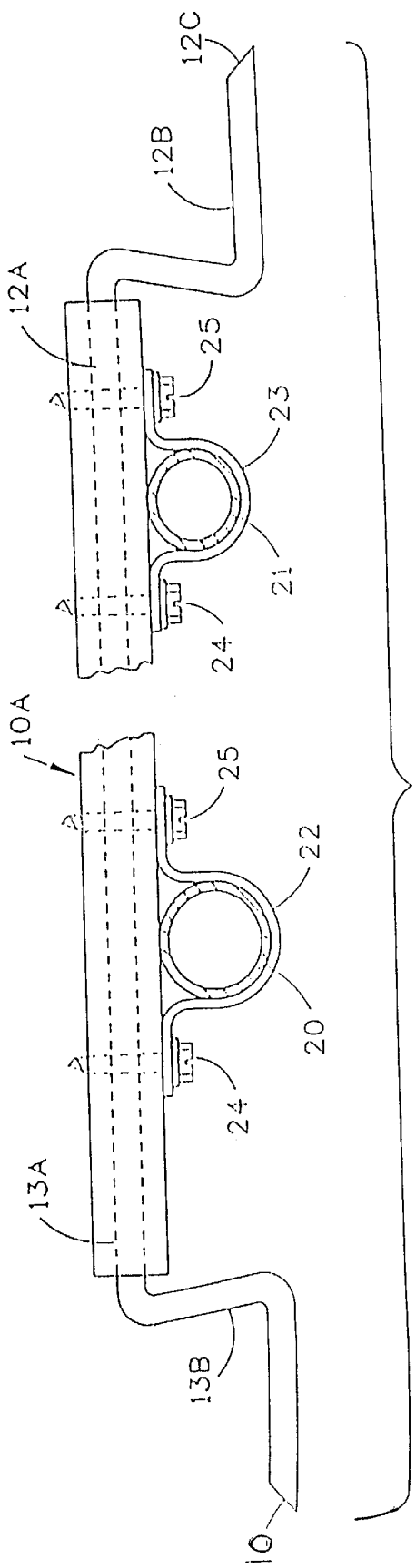

DUCT BRACKET WITH PIPE CLAMPS

CROSS REFERENCE TO RELATED APPLICATION

This application is a continuation-in-part application of application Ser. No. 09/080,565 filed May 18, 1998, now U.S. Pat. No. 6,062,515, and application Ser. No. 29/108, 096 filed Jul. 20, 1999, now U.S. Pat. No. D436,835.

BACKGROUND OF THE INVENTION

1. Technical Field

The present invention generally relates to brackets and, more particularly, to brackets that support fluid-carrying ducts or pipes between adjacent joists in a building structure. Specifically, the present invention relates to a bracket used to support one type of duct above the bracket while supporting another type of duct below the bracket with U-shaped clamps that snap onto the main body member of the bracket and are slidably adjustable.

2. Background Information

As is well known in heating, cooling, ventilating and air-conditioning systems (HVAC systems) in residential homes, apartments, condominiums, office buildings and other building structures, the duct members are usually comprised of metallic pipes, hollow composite materials such as tubes, and the like supported from and between floor or ceiling joists. A typical HVAC system includes an elongated main duct from which extend a series of smaller branch or fluid-distributing ducts that are mounted between adjoining floor or ceiling joists. Such main and branch duct members are normally supported by metal wires or adjustable metal hangers that are placed between the joists to support the ducts from below.

One problem with prior art hangers is that they are difficult to cut thus making them difficult to install between non-uniform adjacent joists. Another problem is that the prior art hangers are only horizontally adjustable and cannot be vertically adjusted. Another problem with prior art duct hangers is that they cannot be used to support the water or gas lines that typically run below the air ducts. The installer must use different types of brackets to hang these lines adding time and expense to the installation. The art thus desires an improved bracket that is capable of mounting both types of brackets in a manner that is easy to use.

SUMMARY OF THE INVENTION

In view of the foregoing, the present invention provides a bracket mountable between adjacent joists to support an air duct while providing a holder for supporting a second type of fluid duct. The main bracket includes a main body member having first and second rods slidably and rotatably mounted through the main body member. The rods engage the joist to support the main body member between the joists. A holder is slidingly connected to the main body member.

The invention also provides a bracket having a main body member disposed between adjacent joists and a holder that snaps over the main body member so that it does not have to be installed over an end of the main body member. The holders are configured to hold different sized pipes.

Different embodiments of the main body member are provided with the holders adapted to fit on each embodiment of the main body member.

BRIEF DESCRIPTION OF THE DRAWINGS

The preferred embodiments of the invention, illustrative of the best mode in which applicant contemplated applying the principles of the invention, are set forth in the following description and are shown in the drawings and are particularly and distinctly pointed out and set forth in the appended Claims.

FIG. 8 is a further enlarged top plan view of the bracket shown in FIGS. 6 and 7 severed in a medial region;

FIG. 9 is a side elevational view of the bracket shown in FIG. 8 showing the pair of U-shaped clamps affixed to the bracket in spaced-apart relation;

Similar numbers refer to similar parts throughout the application.

DESCRIPTION OF THE PREFERRED EMBODIMENTS

Figure 1:
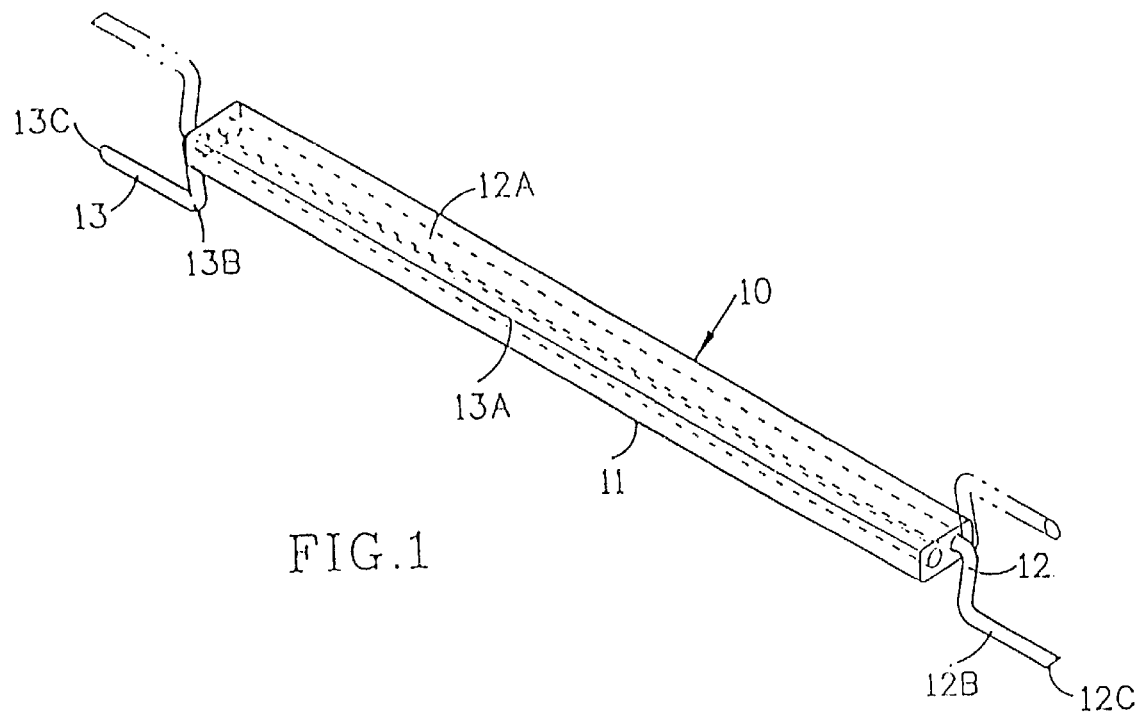
FIG. 1 is a perspective view of the subject improved bracket for dual use showing the various basic components thereof.
Figure 2:
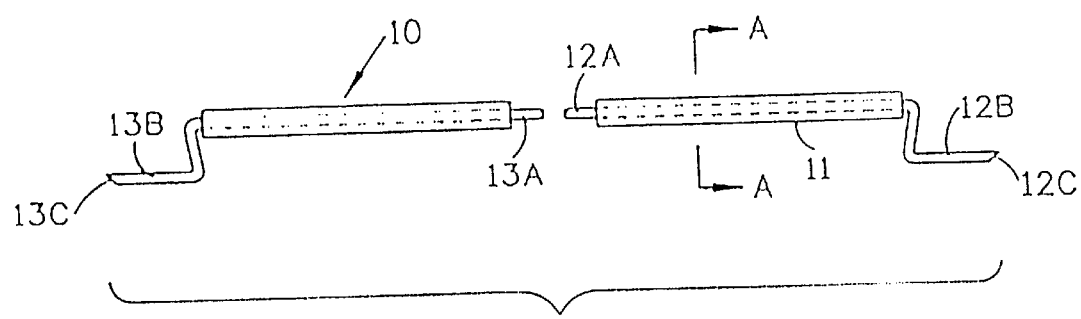
FIG. 2 is a side elevational view of the bracket shown in FIG. 1 severed at its center portion.

As stated supra, in most common types of heating, cooling and ventilating systems which are installed in residential homes, condominiums, apartments and commercial buildings, an elongated main fluid-carrying duct extends from the fluid source, such as a furnace or air-conditioning unit, to a series of branch ducts which normally extend throughout the building structure. The various main and branch ducts are usually located between and parallel to the floor and ceiling joists. The various ducts must be adequately and securely supported in such hollow areas to maintain integrity of the system and to conserve space, especially the headspace for the floors below.

The prior art hangers or brackets, as aforesaid, particularly those having wedge-shaped prongs at their ends, are difficult to forcibly drive into the joists and can experience breakage of one or both prongs. The pronged ends frequently do not retain the load at both ends of the bracket over time, and occasionally require nails to be driven from the bracket into the joists for proper duct support. Also the several layers of metal and substantial depth of section of many known types of brackets cannot be conveniently cut to size at the job-site in order to fit within narrowly-spaced joists.

The present invention provides an improved universal bracket 10 which comprises a generally rectangularly-shaped main body member 11 having a uniform cross-section and a length ranging from about 10 to 12 inches. The optimum preferred length is determined by the normal spacing between adjacent spaced-apart joists in many building structures which is typically 14 inches. The main body member 11 is preferably comprised of relatively rigid durable plastic material such as polypropylene or other comparable plastic material. The body member has preferred dimensions in cross section of about ¼ inch by ½ inch and a pair of hollow open parallel channels extending throughout its length. The similar open channels have uniform open diameters of about ⅛ inch. Obviously, the dimensions of the plastic body member and its inner open channels may be varied widely as desired. The body member 11 has square cut ends and a lineal dimension less than ordinary joist spacing.

A pair of rod-shaped telescoped members 12 and 13 are fitted within the open adjacent channels having straight portions 12a and 13a which extend throughout the major length of the body member. The rod-shaped members 12 and 13 are preferably comprised of about ⅛ inch diameter steel rod or slightly less diameter for their freely slidable mounting within the open channels of the body member. The rods add considerable strength to the body member and are freely telescoped therein. The rods 12a and 13a are similarly shaped in circular cross section and have right-angle-shaped projecting free ends which are pointed at their ends. The right-angled end portions are designated as 12b and 13b on the drawings and their pointed terminating end portions as 12c and 13c. The rod members 12 and 13 may be freely rotated within the channels through a full 360 degrees of rotation for ready mounting of the bracket in any desired orientation. The straight rod portions of the rod members 12 and 13 may be slid both inwardly and outwardly for ready adjustable installation of the bracket. The fully rotatable character of the metallic rods in the body member permit a wide range of vertical adjustment of bracket mounting. The projecting pointed ends of the rod members are adapted to penetration of the wooden joists by forcibly pounding or impacting of the right-angled end portions of the rod members with a hammer or other device.

Figure 3:
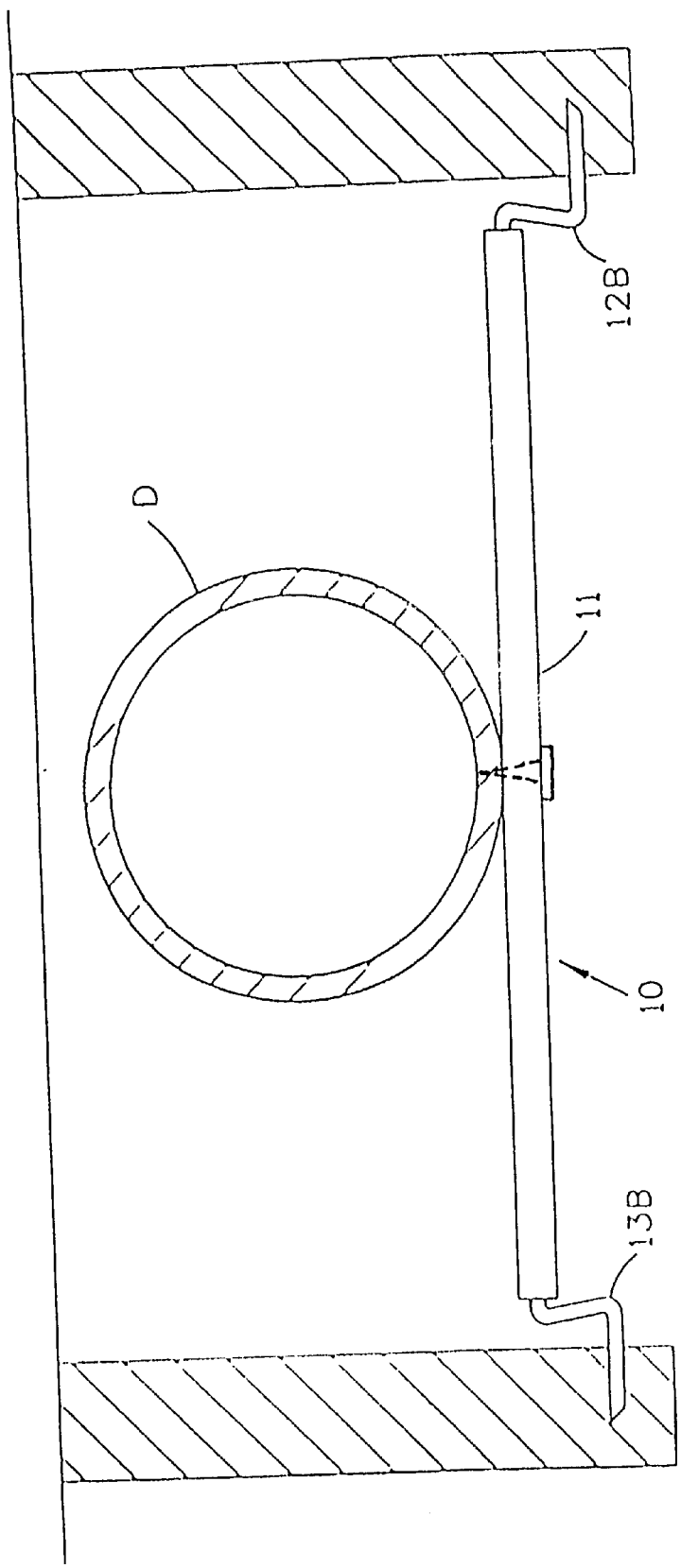
FIG. 3 is a side elevational view of the bracket with its main body portion in raised position supporting an air duct and its projecting angular ends in a lower position supported by floor joists shown in section.
Figure 4:
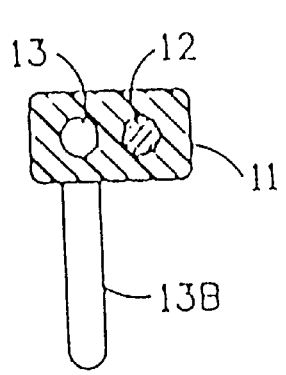
FIG. 4 is an enlarged fragmentary vertical sectional view of the bracket taken along the line A—A of FIG. 2.
Figure 5:
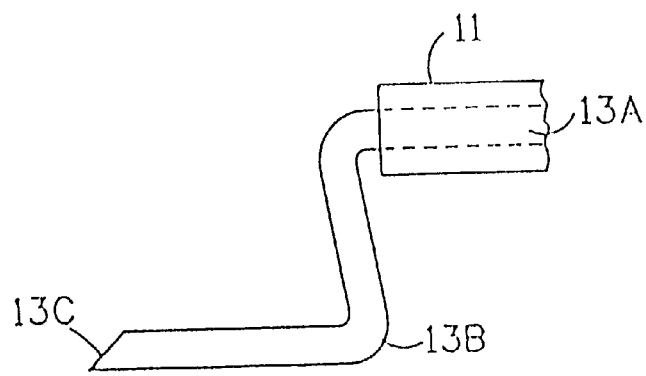
FIG. 5 is an enlarged side elevational view of one end portion of the bracket showing one projecting pointed end.

FIG. 3 shows the bracket with its main body member in its upper position supporting the hollow air duct. The projecting ends of the rod members are turned downwardly with their pointed terminating portions driven into the joists in their uppermost position.

Figure 6:
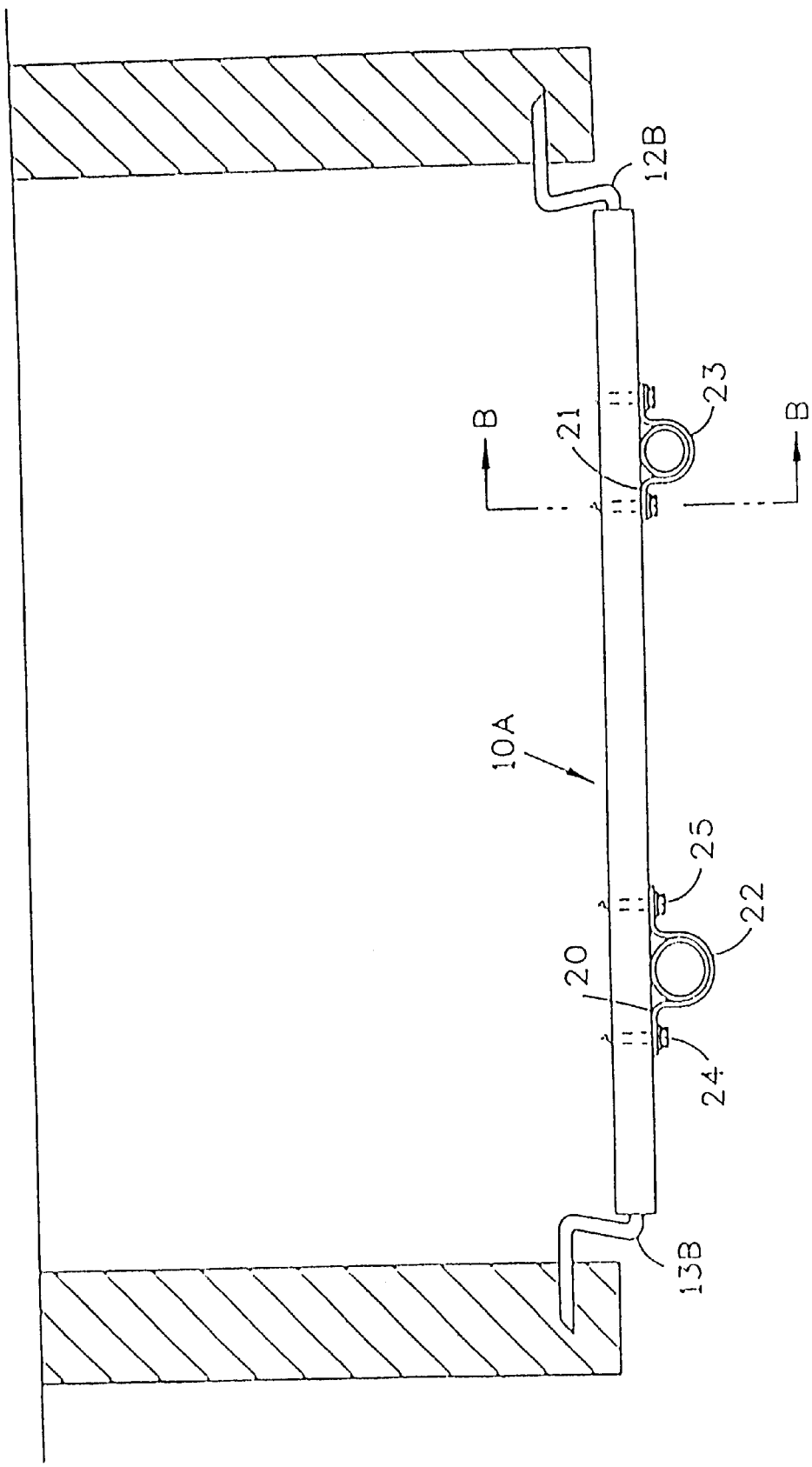
FIG. 6 is a side elevational view of the bracket similar to FIG. 3 with the main body portion in lower position with a pair of U-shaped clamps affixed to its lower side for retaining a pair of water pipes.

FIG. 6 shows another embodiment of the bracket 10a with its main body member in its lower position with the projecting ends 12b and 13b in their upper positions for duct or water line support. The projecting ends of the rods may also be mounted in the joists in the same plane as the main body portion as desired or in other alternative orientation. In addition, one projecting end can be turned upwardly and the other downwardly as desired for installation of the bracket 10 or 10a. The right-angled projecting ends 12b and 13b of the rod members are suitable for their forceful pounding into the wooden joists.

The bracket does not require the cutting of its main body member which is sized to fit between normal joist spacing with some relatively loose freedom of movement. The largely enclosed rod members 12 and 13 being journaled telescopically in the main body member 11 permit their movement both laterally and rotationally for quick and ready mounting of the bracket 10 or 10a in both horizontally and vertically positive alignment with the ducts, or water lines and joists.

With the plastic main body member comprised preferably of polypropylene or high-density polyethylene, for example, having some flexibility and resiliency, the bracket 10 or 10a is mounted under the ducts or water lines and between the joists without any direct metal-to-metal contact or interconnection. The plastic body member absorbs essentially any and all vibration and resonance which occurs in the ducts and water lines due to forceful air flow and water flow as well as mechanical vibration of moving components of the system such as motors, fans and pumps. It has been observed that a marked dampening or complete elimination of noise and vibration from the fluid-carrying system, whether it consists of air or water flow, is obtained which is a very significant feature and benefit of the subject bracket. When the main and branch ducts or water lines of the system are all supported by a plurality of the subject brackets, a measurable reduction of tones of noise is obtained, especially over the long-term working life of the system. FIG. 3 shows the bracket 10 properly-installed between adjoining joists with the duct D resting on and supported by its upper surface of the bracket. A screw may be used to secure duct D in place. FIG. 6 shows the bracket 10a in the modified embodiment with a pair of water lines 20 and 21 supported in a pair of U-shaped clamps 22 and 23 attached to the underside of the bracket 10a.

The subject brackets 10 and 10a when properly installed can readily handle heavy weights as indicated by testing of the brackets with concrete blocks suspended between a pair of the brackets installed between joists. The brackets when so loaded will tend to bow downwardly, but strengthen due to a wedging action of the angled projecting ends of the bracket, whether the projecting seated ends are placed above or below the plastic main body member on both sides thereof, or in the same plane as main body 11, the brackets show the same strengthening-effect.

Figure 7:
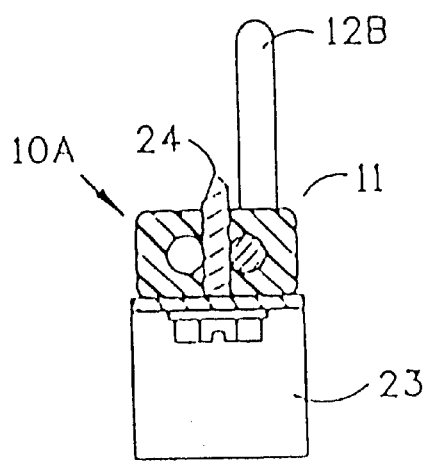
FIG. 7 is an enlarged fragmentary vertical sectional view of the bracket taken along the line B—B of FIG. 6.

In the foregoing description, certain terms have been used for brevity, clearness and understanding; but no unnecessary limitations are to be implied therefrom beyond the requirement of the prior art, because such terms are used for descriptive purposes and are intended to be broadly construed FIGS. 6 and 7 show the pair of U-shaped clamps 22 and 23 attached to the main body member 11 of the bracket by a pair of metal screws threaded into the body member in self-seating arrangement. The screws 24 and 25 are attached within a medial region of the bracket centered so that the screws pass between the rod members 12 and 13 seated in the main body member. The screws 24 and 25 are usually attached in such area after the bracket is mounted between joists with the rod members in their normally seated positions. The screws also serve to lock the rod members in fixed position so that their projecting ends cannot separate from the joists. The water pipes 26 and 27 may be the same or dissimilar diameter for water delivery or for waste water lines.

Thus, the brackets 10 or 10a can be used serially attached to plural floor or ceiling joists or other building members over long runs to support both ducts and/or water lines as desired. The brackets can be used for ducts only or for water lines thereof, or for other members to be supported.

An alternative embodiment of the bracket of the present invention is indicated generally by the numeral 100 in the accompanying drawings. Bracket 100 is designed to be installed between adjacent joists to support a fluid duct, such as the air duct depicted in FIG. 3. Bracket 100 also supports secondary ducts, such as water lines 102 and 104, in holders 106 that are connected to the main body member 108 of bracket 100. In accordance with the goals of the present invention, holders 106 are adapted to snap over main body member 108 so that they do not have to be slid over its ends. The position of holders 106 may be adjusted along main body member 108 by sliding them back and forth once they are positioned on main body member 108. The manner in which holders 106 are installed and the manner in which they may be slidingly adjusted allows the user to easily install holders 106.

Main body member 108 includes channels 110 that extend substantially parallel and longitudinally through main body member 108. First 112 and second 114 rods are slidably and rotatably received in channels 110. Each rod 112 and 114 has a projecting end that extends out of main body member 108 and is adapted to support bracket 100 in a typical floor or ceiling joist. As described above, each projecting end is offset from the main portion of the rod by an offset 116. Offset 116 allows the height of main body member 108 to be adjusted with respect to the joist by rotating main body member 108 on rods 112 and 114. Each rod 112 and 114 is pointed so that it may be forced into the adjacent wooden joist. Each offset 116 is preferably at a substantial right angle to rod 112 or 114.

Main body member 108 includes a pair of opposed legs 130 projecting upwardly from a top wall 132. Channels 110 have substantially square cross sections. The bottom corners 134 are rounded. Main body member 108 is preferably fabricated from an extruded plastic material. Other materials may be used without departing from the concepts of the present invention. Main body member 108 may also include longitudinal notches 136 disposed in top wall 132 and bottom wall 138. Notches 136 are configured to optionally receive the screws 24 or 25 described above. Notches 136 properly position screws 24 or 25 directly between channels 110.

Figure 15:
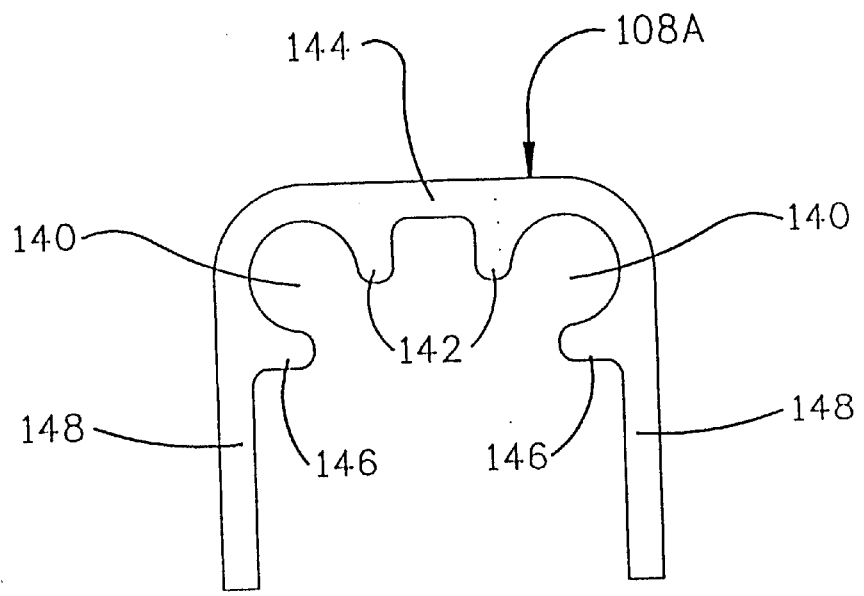
FIG. 15 is an end view of a first alternative embodiment of the main body member.

A first alternative of main body member 108 is depicted in FIG. 15 and is indicated generally by the numeral 108a. Main body member 108a serves the same function as main body member 108 described above. Main body member 108a is preferably fabricated from a metal such as extruded aluminum. Main body member 108a includes channels 140 that perform the same function as channels 110 described above. Channels 140 are formed through the cooperation of a first ridge 142 projecting inwardly from the top wall 144 and a second ridge 146 projecting inwardly from a leg 148 that projects from one of the ends of top wall 144. Main body member 108a is substantially symmetric about its longitudinal axis. When fabricated from an appropriate metal such as aluminum, main body member 108 shown in FIG. 15 has sufficient rigidity to span the larger distances between modern joists while slidably and rotatably receiving rods 112 and 114 while simultaneously supporting holders 106.

Figure 16:
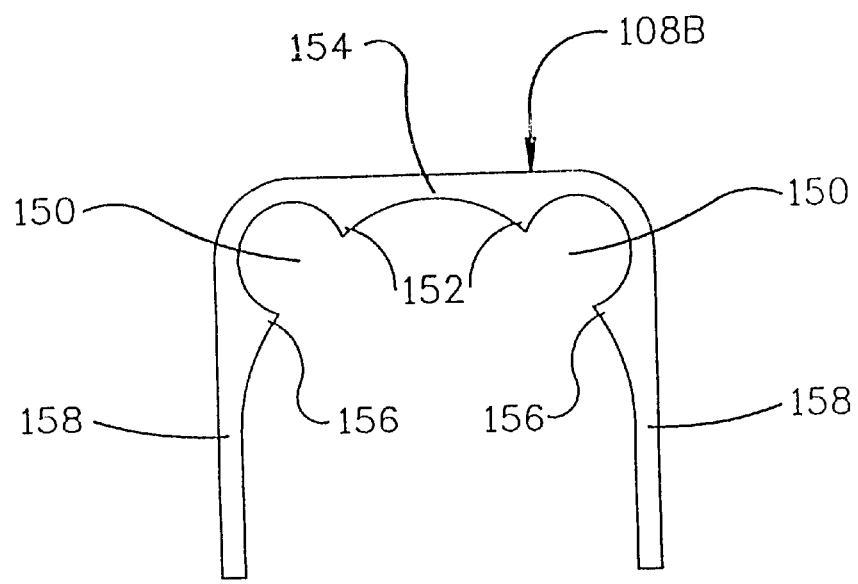
FIG. 16 is an end view of a second alternative embodiment of the main body member.

A second alternative embodiment of the main body member as depicted in FIG. 16 and is indicated generally by the numeral 108b. This embodiment may also be fabricated from metal such as extruded aluminum. Main body member 108b also includes channels 150 formed between projections 152 and 156 that project inwardly from the top wall 154 and legs 158 respectively.

Each holder 106 includes a U-shaped body 160 having first and second ends. An arm 162 is connected to each end of body 160. Arms 162 are adapted to snap over main body member 108 and slide along main body member 108 once U-shaped holder 106 is installed. In other embodiments, the body of holder 106 may be formed in shapes other than the U-shaped bodies 160 depicted in the drawings. For instance, body 160 may be C-shaped, hook-shaped, L-shaped, O-shaped, V-shaped, or other shapes known to those skilled in the art for holding items such as pipes or ducts.

Figure 11:
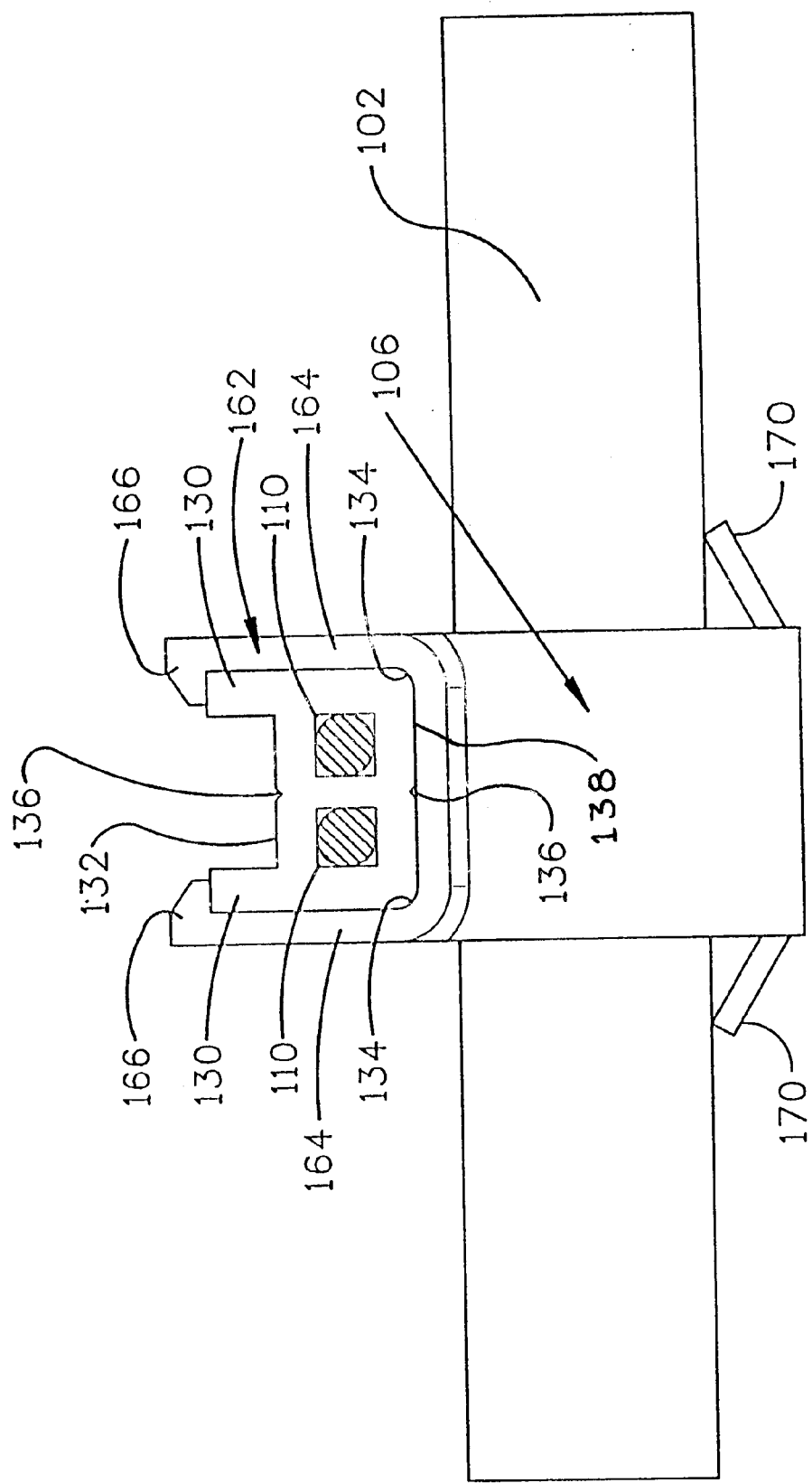
FIG. 11 is a sectional view taken along line 11—11 of FIG. 10.
Figure 12:
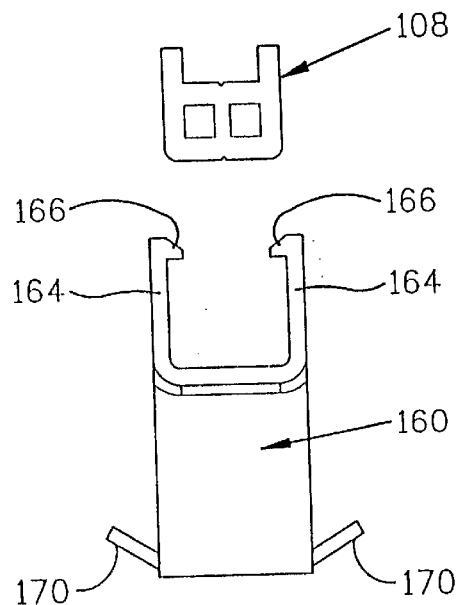
FIG. 12 is a view similar to FIG. 1 showing a U-shaped holder completely removed from the main body member but aligned to be installed.

Each arm 162 includes a pair of opposed resilient fingers 164. Fingers 164 are substantially parallel and project away from body 160. The length of each finger 164 is substantially equal to the height of main body member 108 as depicted in FIG. 11. The interior of each arm 162 is configured to substantially match the exterior configuration of main body member 108 so that a substantially snug fit is achieved when arm 162 is snapped over main body member 108. In the preferred embodiment, the fit is not, however, tight enough to prevent holder 106 from being slidably adjusted along body member 108. In other embodiments, the interior of each arm 162 does not substantially match the exterior configuration but is still configured to snap over main body member 108, 108A, or 108B.

Figure 13:
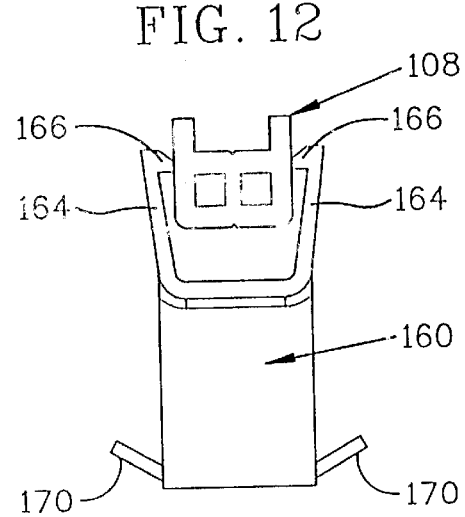
FIG. 13 is a view similar to FIG. 11 showing the U-shaped holder being installed on the main body member.
Figure 14:
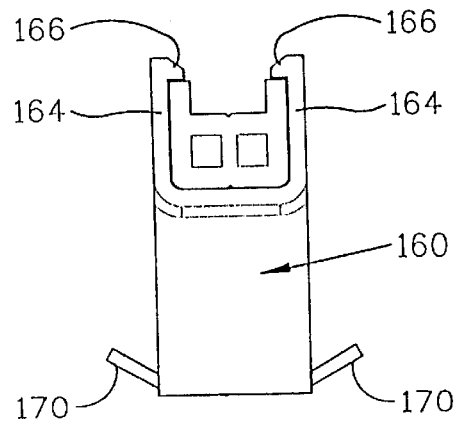
FIG. 14 is a view similar to FIG. 11 showing the U-shaped holder fully installed on the main body member.

Each finger 164 includes an inwardly projecting hook 166. Hook 166 includes an upper surface that is angled down and toward the interior of arm 162 to form a camming surface. Hook 166 functions by engaging surface 138 of main body member 108 and forcing fingers 164 outwardly as depicted in FIG. 13 when holder 106 is being installed on main body member 108. The inner surface of each hook 166 is substantially square or perpendicular to fingers 164 to form a catch surface that engages legs 130 to prevent U-shaped holder 106 from being easily removed from main body member 108. The use of hooks 166 requires each finger 164 to be sufficiently resilient to allow arm 162 to be snapped over main body member 108. The resiliency is preferably achieved by fabricating arms 162 from a plastic material.

Figure 10:
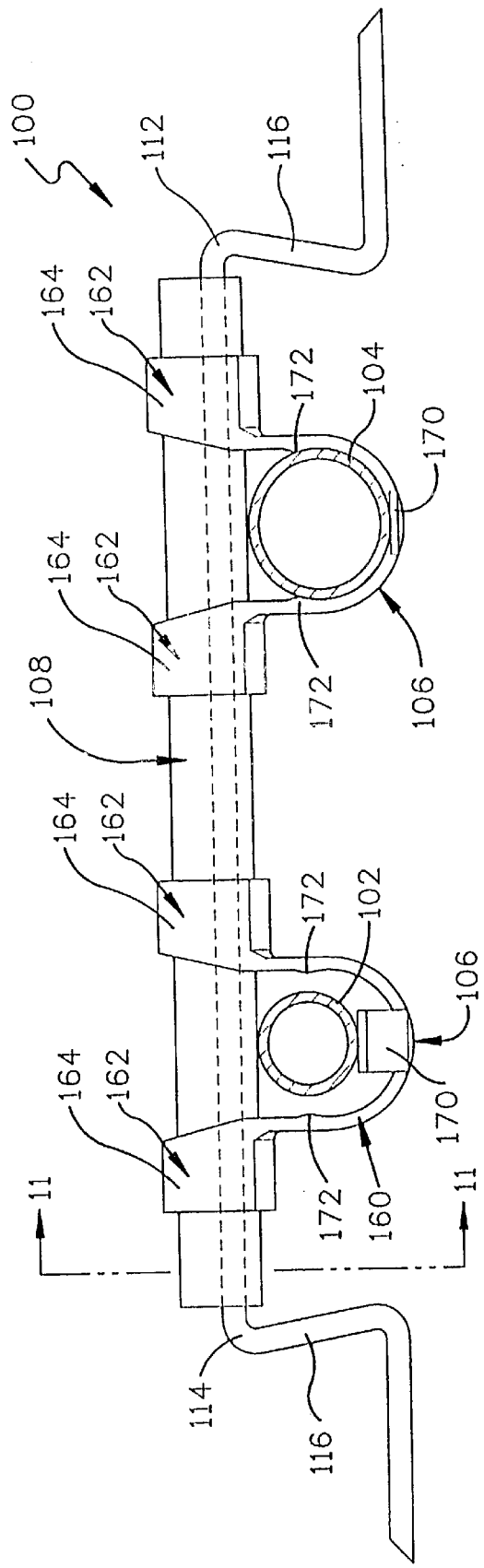
FIG. 10 is a side elevational view of an alternative embodiment of the bracket of the present invention.

A pair of spring bars 170 extend upwardly and outwardly from the bottom portion of body 160. Spring bars 170 are configured to securely hold ducts 102 in holders 106. Spring bars 170 allow different diameter ducts 102 and 104 to be installed in a single sized holder 106 as shown in FIG. 10. When a small diameter tube 102 is installed, tube 102 rests on top of bars 170 and against the underside of main body member 108. When a larger diameter duct 104 is installed, spring bars 170 are pressed substantially horizontal and duct 104 is held in position by a pair of opposed protrusions 172. Protrusions 172 extend inwardly from the sides of body 160 to form an area of reduced width. The space between protrusions 172 is smaller than the interior diameter of body 160. Body 160 is, however, adapted to be resilient so that duct 104 can snap between protrusions 172 when it is installed.

Figure 17:
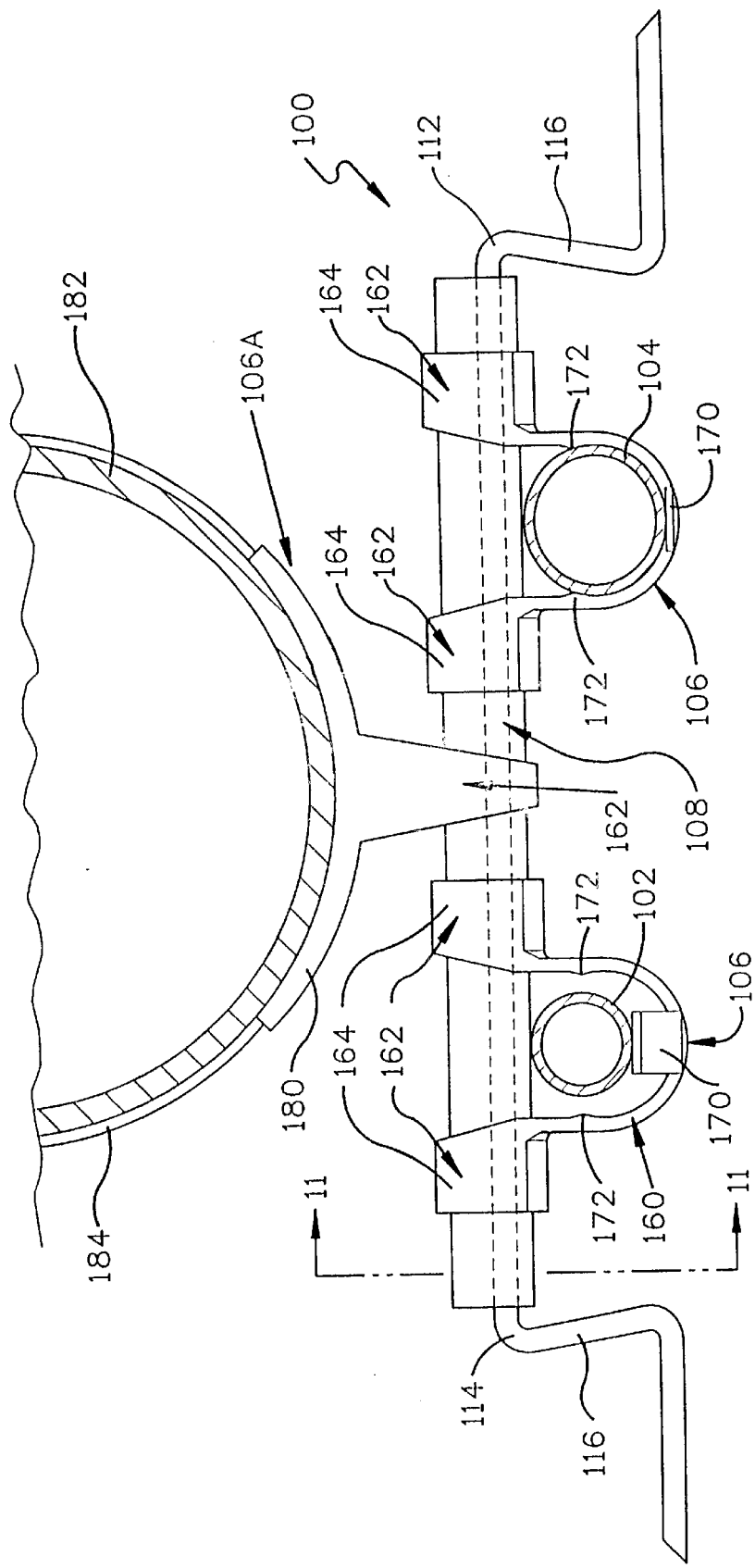
FIG. 17 is a view similar to FIG. 10 showing a second type of holder supporting a pipe above the bracket.

Holders 106 may also be connected to main body member 108 with a single arm 162 as shown in FIG. 17. In FIG. 17, holder 106A is connected to the opposite side of main body member 108. Holder 106A includes arm 162 and a cradle 180 that holds ducts or pipes 182 above bracket 100. If desired, a connector 184 may be used to secure pipe 182 to cradle 180. Connector 184 may be a strap latched to each end of cradle 180.

Each body 108, 108A, and 108B may receive arm 162 from the top or the bottom so that holders 106 or 106A may extend above or below body 108, 108A, or 108B. The rounded corners of body 108, 108A, and 108B create less of a secure attachment than the sharp corners on the other half of body 108, 108A, and 108B.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention are by way of example, and the scope of the invention is not limited to the exact details shown or described.

Various modifications may be resorted to within the spirit and scope of the appended claims.

I claim:

1. A bracket, comprising:
   a main body member having first and second channels extending longitudinally through the main body member;
   a first rod slidably and rotatably mounted in the first channel;
   the first rod having a projecting end extending out of the main body member;
   a second rod slidably and rotatably mounted in the second channel;
   the second rod having a projecting end extending out of the main body member;
   the projecting end of the first rod being on an opposite end of the main body member than the projecting end of the second rod; and
   a holder slidingly connected to the main body member.

2. The bracket of claim 1, wherein the holder includes:
   a U-shaped body having first and second ends;
   a first arm connected to the first end of the U-shaped body;
   a second arm connected to the second end of the U-shaped body; and
   each of the arms being slidingly connected to the main body member.

3. The bracket of claim 2, wherein each of the arms includes opposed resilient fingers; the fingers being disposed on opposite sides of the main body member.

4. The bracket of claim 3, wherein the main body member has a top surface and a bottom surface; each finger including a hook; the hooks projecting toward each other and hooking over the top surface of the main body member when the U-shaped body is disposed under the bottom surface of the main body member.

5. The bracket of claim 4, wherein each hook has an upper surface angled down and in allowing the hook to be easily snapped over the main body member.

6. The bracket of claim 2, wherein the U-shaped body has an inner diameter and a pair of opposed protrusions extending toward each other defining a space between the protrusions; the space between the protrusions being smaller than the inner diameter of the U-shaped body.

7. The bracket of claim 6, wherein the U-shaped body is resilient and adapted to allow the protrusions to snap over a pipe having an outer diameter slightly smaller than or substantially the same as the inner diameter of the U-shaped body.

8. The bracket of claim 2, wherein the U-shaped body includes at least one spring bar connected to the bottom of the U-shaped body and projecting outwardly and upwardly.

9. The bracket of claim 8, further comprising a second spring bar projecting outwardly and upwardly from the U-shaped body.

10. The bracket of claim 1, wherein the main body member includes a pair of opposed legs.

11. The bracket of claim 10, wherein the first and second channels have square cross sections.

12. The bracket of claim 10, wherein the main body member includes a top wall with the pair of opposed legs projecting from opposite sides of the top wall.

13. The bracket of claim 12, further comprising a pair of first ridges projecting inwardly from the top wall and a pair of opposed second ridges projecting inwardly from the legs; the first and second ridges defining at least a portion of the channels.

14. The bracket of claim 1, wherein the projecting end of each rod is offset from the main body member.

15. The bracket of claim 14, wherein the projecting end of each rod is pointed.

16. The bracket of claim 15, wherein the projecting end of each rod is right-angle shaped.

17. A bracket, comprising:
   a main body member having first and second channels extending longitudinally through the main body member;
   a first rod slidably and rotatably mounted in the first channel;
   the first rod having a projecting end extending out of the main body member;
   a second rod slidably and rotatably mounted in the second channel;
   the second rod having a projecting end extending out of the main body member;
   the projecting end of the first rod being on an opposite end of the main body member than the projecting end of the second rod; and
   a holder having at least one arm adapted to snap over the main body member to connect the holder to the main body member.

18. The bracket of claim 17, wherein the holder includes:
   a U-shaped body having first and second ends;
   a first arm connected to the first end of the U-shaped body;
   a second arm connected to the second end of the U-shaped body; and
   each of the arms being slidingly connected to the main body member.

19. The bracket of claim 18, wherein each of the arms includes opposed resilient fingers; the fingers being disposed on opposite sides of the main body member.

20. The bracket of claim 19, wherein each finger includes a hook; the hooks projecting toward each other and hooking over the top surface of the main body member when the U-shaped body is disposed under the bottom surface of the main body member.

21. The bracket of claim 20, wherein each hook has an upper surface angled down and in allowing the hook to be easily snapped over the main body member.

22. The bracket of claim 17, wherein the projecting end of each rod is pointed.

23. The bracket of claim 17, wherein the projecting end of each rod is offset from the main body member.

24. The bracket of claim 23, wherein the projecting end of each rod is right-angle shaped.

\* \* \* \* \*